United States Patent
Stefanutti et al.

US 6,764,732 B2
Jul. 20, 2004

(54) ADHESIVE MAGNET RECEPTIVE MEDIA

(75) Inventors: Paul Stefanutti, Bloomfield Village, MI (US); John Willwerth, Bloomfield, MI (US); Dayton J. Deetz, Mendon, MA (US)

(73) Assignee: Magna Paper LLC, Mendon, MA (US)

( * ) Notice: Subject to any disclaimer, the term of this patent is extended or adjusted under 35 U.S.C. 154(b) by 24 days.

(21) Appl. No.: 10/193,615

(22) Filed: Jul. 11, 2002

(65) Prior Publication Data

US 2004/0009326 A1 Jan. 15, 2004

(51) Int. Cl.[7] .................................................. B32B 9/00
(52) U.S. Cl. .................. 428/40.1; 428/343; 428/306.6; 428/317.9; 428/900; 428/692; 40/621; 40/600; 442/61; 427/127
(58) Field of Search ............................. 428/40.1, 343, 428/306.6, 317.9, 900, 692; 40/621, 600; 442/61; 427/127

(56) References Cited

U.S. PATENT DOCUMENTS

| 4,309,011 A | | 1/1982 | Spector |
| 4,635,410 A | | 1/1987 | Chumbley |
| 4,996,110 A | * | 2/1991 | Tanuma et al. .............. 428/343 |
| 5,008,139 A | | 4/1991 | Ochi et al. |
| 5,079,058 A | | 1/1992 | Tomiyama et al. |
| 5,130,184 A | | 7/1992 | Ellis |
| 5,178,573 A | | 1/1993 | Smith |
| 5,203,847 A | | 4/1993 | Butt |
| 5,361,164 A | | 11/1994 | Steliga |
| 5,428,332 A | | 6/1995 | Srail et al. |
| 5,446,072 A | | 8/1995 | Mitsutake et al. |
| 5,452,508 A | | 9/1995 | Wu |
| 5,476,559 A | | 12/1995 | Chiro |
| 5,503,891 A | * | 4/1996 | Marshall et al. .............. 428/99 |
| 5,567,757 A | | 10/1996 | Szczepanski |
| 5,599,866 A | | 2/1997 | Staadecker |
| 5,609,788 A | | 3/1997 | Deetz |
| 5,666,112 A | | 9/1997 | Crowley et al. |
| 5,843,329 A | | 12/1998 | Deetz |
| 5,949,050 A | | 9/1999 | Fosbenner et al. |
| 6,020,062 A | | 2/2000 | Questel et al. |
| 6,065,253 A | | 5/2000 | Ojeda |
| 6,217,405 B1 | | 4/2001 | Burrows |
| 6,235,378 B1 | | 5/2001 | Lowder |
| 6,251,500 B1 | | 6/2001 | Varga et al. |
| 6,302,363 B1 | | 10/2001 | Olson et al. |
| 6,362,434 B1 | * | 3/2002 | Yoshida et al. .............. 174/256 |
| 6,468,614 B1 | * | 10/2002 | LeVine et al. .............. 428/40.1 |
| 2002/0081446 A1 | * | 6/2002 | Boudouris et al. .......... 428/469 |
| 2003/0152731 A1 | * | 8/2003 | Deetz et al. .............. 428/40.1 |

\* cited by examiner

*Primary Examiner*—William P. Watkins, III
(74) *Attorney, Agent, or Firm*—Carlson, Gaskey & Olds

(57) ABSTRACT

A magnet receptive medium comprises a sheet having a first surface, a second surface, and an interior between the first surface and the second surface. At least one pathway between at least one of the surfaces and through the interior is formed. Magnetic particles of a predetermined size sufficient to pass through the pathways exist in such pathways. A binding agent may bind the particles to the interior.

19 Claims, 2 Drawing Sheets

ADHESIVE MAGNET RECEPTIVE MEDIA

BACKGROUND OF THE INVENTION

This invention relates to a magnet receptive tape.

Wall coverings exist that create a magnetically interactive surface. For example, a magnetic board made of steel sheet may be mounted to a wall, permitting magnets to be appended on the wall for entertainment and business purposes. While such articles are useful, they are cumbersome, heavy and difficult to transport. Moreover, they are expensive to produce.

It is also known to use a magnetic paint to create a magnet attracting surface. Such a paint may contain ferromagnetic particles and be applied to the wall. However, painting a wall with magnetic paint is time consuming. Moreover, like the magnetic board, such a surface is difficult to remove once applied. Indeed, typically, the surface with the magnetic paint is left permanently on the wall after its use.

A significant problem encountered in the development of magnetically attractive surfaces is the need to apply a sufficient amount of magnetic receptive material, such as a layer of ferromagnetic coating, without increasing the thickness, weight or inflexibility of the surface. In the case of the magnetic board, the sheet comprises a layer of steel sheet. Accordingly, the board has the heaviness and inflexibility of the steel sheet.

As to the magnetic paint, the layer of ferromagnetic material is formed as a paint coating. The painted surface, such as the wall, provides the supporting structure or substrate for the paint coating. Again, the supporting structure for the magnet receptive materials is rigid and heavy. The foregoing magnet receptive surfaces are greatly limited in the scope of their use.

A need therefore exists for a medium that offers the benefits of a magnet receptive surface while offering greater flexibility in the medium's application.

SUMMARY OF THE INVENTION

The invention comprises a magnet receptive medium, such as a tape, comprising a sheet with two sides and a porous interior between the two sides. The pores are such that pathways exist between the surfaces that permit magnetic particles of a predetermined size to pass from the surface to the interior. In this way, a non-magnetic sheet may be imbued with magnetic qualities, either magnet receptive or magnetized. Thus, the sheet can retain many of its original qualities including lightweight, flexibility, and transportability.

A binding agent may be used to secure the magnetic particles to the interior of the sheet. The binding agent may have a fluid state and a solid state. When the binding agent is in fluid form, it is mixed with the magnetic particles of the fluid. A bath of the mixture is drawn for the sheet, which is allowed to soak up the binding agent and the magnetic particles. The sheet is then removed from the bath. When the binding agent dries, it binds the particles to the pathways of the interior. Because the particles are bound to the interior, the sheet may be magnetic receptive without appreciably increasing its thickness or weight.

An adhesive layer may be applied to one or both surfaces of the sheet. The magnet receptive sheet may be thus appended to a surface, such as a wall. The adhesive may be pressure sensitive and comprise a layer of adhesive particles. Such an adhesive could permit the sheet to be applied to a wall, removed and then reapplied to the wall or another location.

The sheet may be woven or non-woven depending on the particular use for the magnet receptive sheet. It may also be flexible to permit it to be rolled up in a tape roll for ease of use and transportability. The sheet may also be made of non-magnetic material, such as plastic. A great variety of materials may be used to support the magnetic material.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows.

DETAILED DESCRIPTION OF THE PREFERRED EMBODIMENTS

Figure 1:
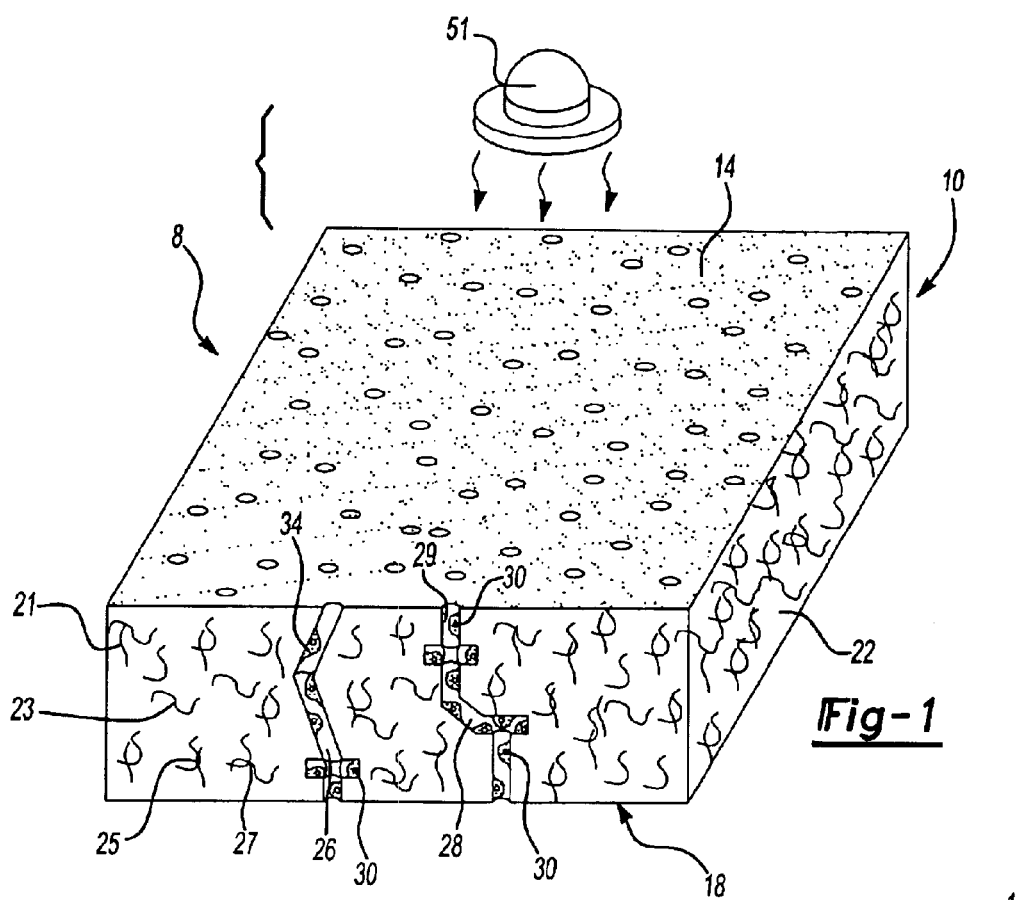
FIG. 1 illustrates the magnet receptive medium, including sheet, pathways and magnetic particles.

FIG. 1 illustrates magnet receptive medium 8, comprising sheet 10 having first surface 14 and second surface 18. Interior 22 is defined by first surface 14 and second surface 18. Sheet 10 may comprise a fibrous material, here a non-woven material, having fibers arranged in a somewhat random fashion as known. Fibers, such as fiber 21, fiber 23, fiber 25, and fiber 27, may be formed so as to form cells, such as cell 29, within interior 22. These cells give sheet 10 a porous quality.

The porous nature of interior 22 is such that pathways, such as pathway 26 and pathway 29, may be formed between first surface 14 and second surface 18. Pathways, such as pathway 26 and pathway 29, have sufficient size to permit ferromagnetic particles 30 to pass from first surface 14 or second surface 18 to interior 22. These pathways may extend from surface 14 to surface 18. With ferromagnetic particles 30 within interior 22, the surfaces 14 and 18, become magnetically receptive to magnet 51. Notably, the introduction of ferromagnetic particles 30 into interior 22 does not appreciably increase thickness or weight of sheet 10.

Figure 1A:
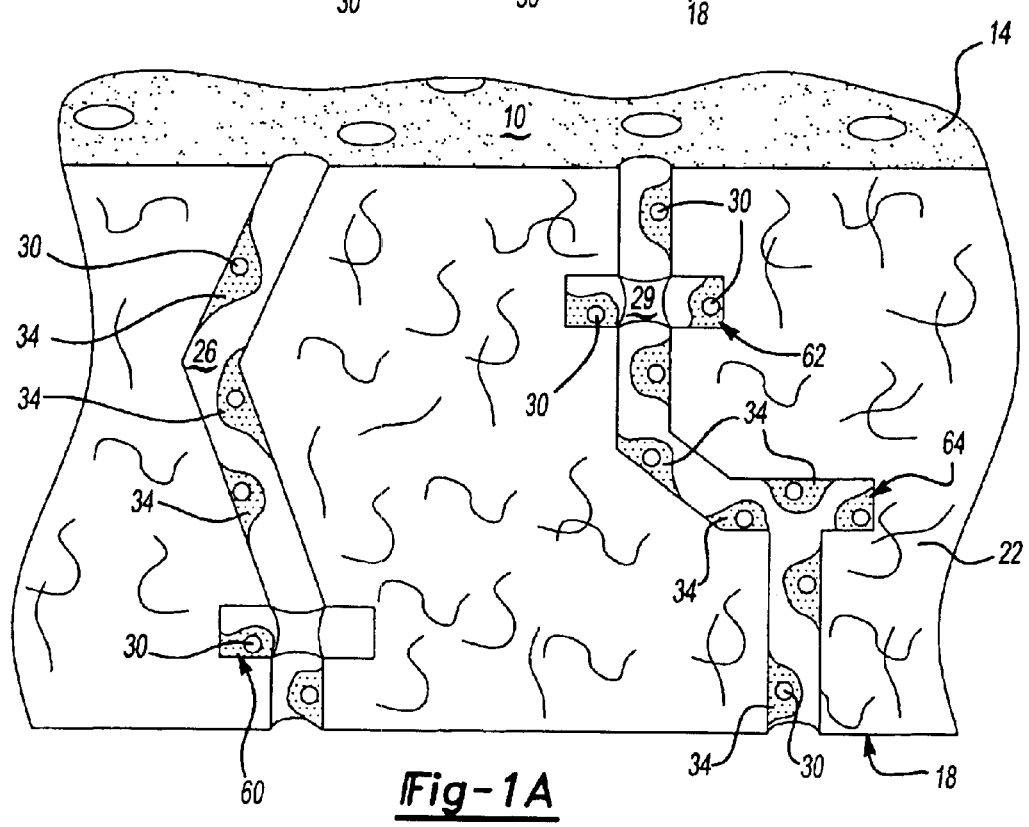
FIG. 1A illustrates a close up view of the embodiment of FIG. 1, illustrating the adhesion of the magnetic particles to the interior through a binding agent.

As illustrated in FIG. 1A, ferromagnetic particles 30 are bound to interior 22 of sheet 10 by binding agent 34 in pathways 26 and 29. Binding agent 34 may be a substance, such as latex, having ferromagnetic particles disbursed within the agent while in a fluid state. Binding agent 34 with particles 30 suspended in fluid form is then passed through pathways 26 and 29. Binding agent 34 is then permitted to dry within interior 22 of sheet 10, causing ferromagnetic particles 30 to bind to interior 22 in pathways, such as pathway 26 and pathway 29. The precise binding agent employed will vary with the selected material of sheet 10. One of ordinary skill in the art may select the particular binding agent needed for a particular material.

Figure 1B:
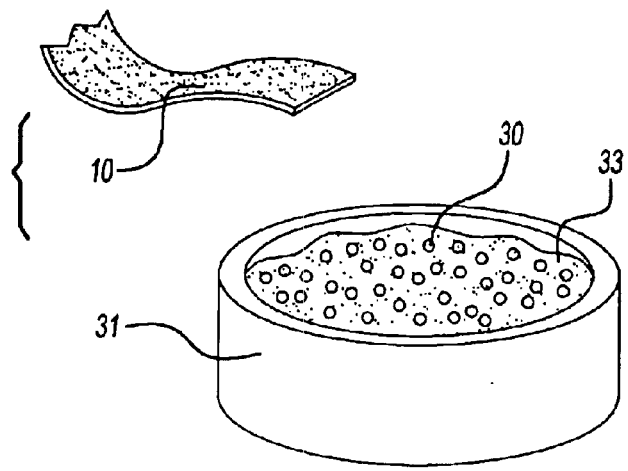
FIG. 1B illustrates a technique for creating a magnet receptive sheet.

FIG. 1B shows a method of soaking sheet 10 with ferromagnetic particles. Ferromagnetic particles 30 are suspended in bath 33 of binding agent 34 while in fluid form. These magnetic particles may be part of a fluid suspension such as a latex coating as taught in Deetz, U.S. Pat. Nos. 5,609,788 and 5,843,329, which are incorporated herein by reference. Sheet 10 is immersed in bath 33 of fluid suspension to permit binding agent 34 with ferromagnetic particles 30 to permeate pathways of sheet 10, such as pathway 26 and pathway 29. It is preferable to use ferromagnetic particles having a diameter of 0.002 inches to 0.150 inches. Pathways should have dimensions large enough to accommodate these particle sizes and the fluid binding agent carrying them.

Referring back to FIG. 1A, ferromagnetic particles 30 may fill pathways 26 and 29 and cells 60, 62 and 64 that intersect these pathways. Sheet 10 is then removed from bath 33. The excess solution is squeezed out of sheet 10 and permitted to dry through known drying processes such as baking the sheet in an oven. Sheet 10 may be magnetized or simply allowed to be receptive to magnets.

Figure 2:
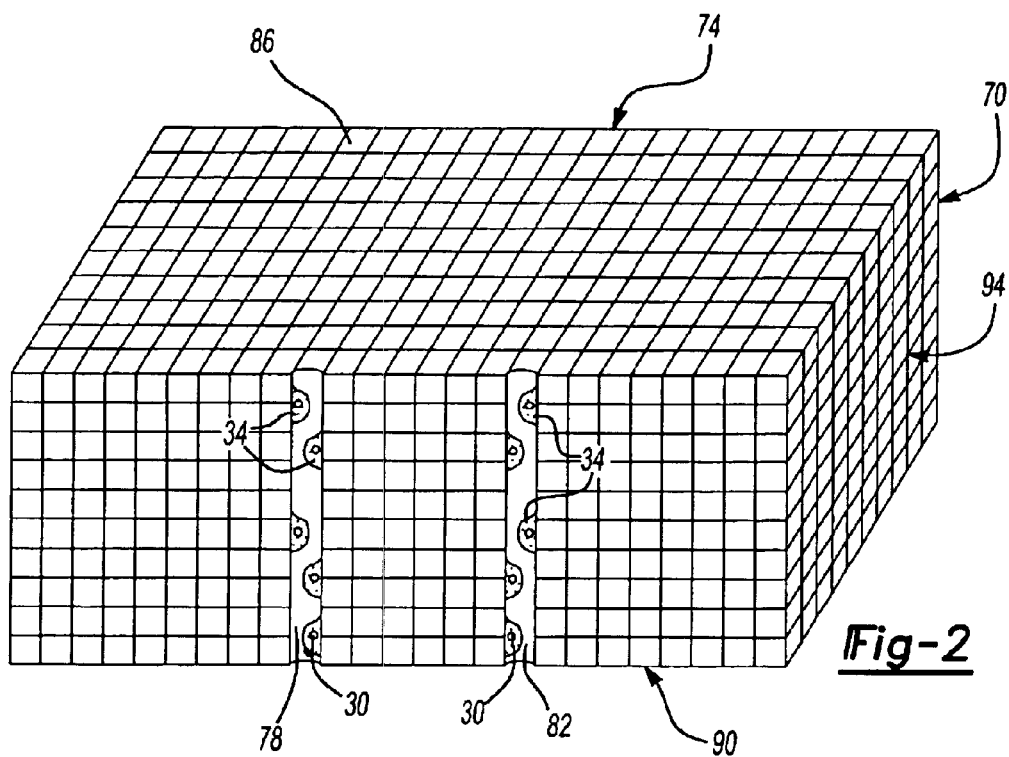
FIG. 2 illustrates another embodiment of the magnet receptive medium, including sheet with pathways in a woven structure.

FIG. 2 illustrates another medium 70, which may be employed. Medium 70 is a sheet 74 of woven material. Woven material 74 has pathways 78 and 82 from first surface 86 to second surface 90. As explained above, ferromagnetic particles 30 may impregnate pathways 78 and 82 through binding agent 34. Binding agent 34 may serve to bind ferromagnetic particles to interior 94 between first surface 86 and second surface 90. A wide variety of media may be employed and impregnated with ferromagnetic particles using the inventive technique. Such materials may be woven or non-woven and may be plastic, metal, magnetic or non-magnetic.

Figure 3:
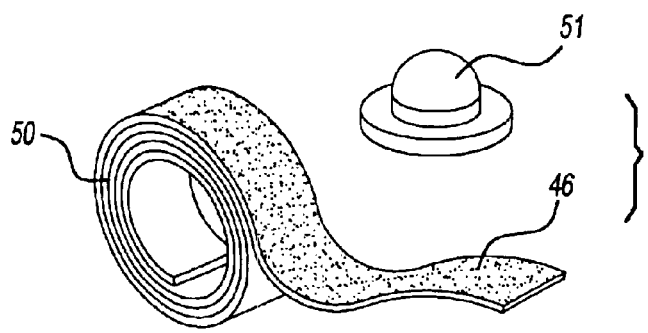
FIG. 3 illustrates a magnet receptive tape with adhesive particles.

FIG. 3 illustrates an article created from the magnet receptive media of the invention. Sheet 10 may have adhesive layer 46, comprising micro-adhesive particles. Preferably, an adhesive such as a GEL-TAC® 142E-2000 adhesive or any other commercially available acrylic polymer microsphere adhesive with adhesive sphere sizes ranging from 10 to 80 microns in diameter may be used. Adhesive layer 46 may be 9½ ounces to 2 ounces per square foot. Adhesive layer 46 may be applied to one of the surfaces of sheet 10, thereby permitting sheet 10 to be applied to a surface such as a wall. Sheet 10 may be made of flexible material such as plastic and may be rolled up into a roll 50 to be dispensable like other adhesive tapes. In this way, sheet 10 may be easily transported and adhered to a surface, thereby creating a magnet receptive surface in any desirable location. Magnet 51 may thus interact with sheet 10.

The aforementioned description is exemplary rather that limiting. Many modifications and variations of the present invention are possible in light of the above teachings. The preferred embodiments of this invention have been disclosed. However, one of ordinary skill in the art would recognize that certain modifications would come within the scope of this invention. Hence, within the scope of the appended claims, the invention may be practiced otherwise than as specifically described. For this reason the following claims should be studied to determine the true scope and content of this invention.

What is claimed is:

1. A magnet receptive medium, comprising:
   a sheet having a first surface, a second surface, and an interior between said first surface and said second surface;
   at least one pathway extending from at least one of said surfaces to said interior;
   at least one magnetic particle of a predetermined size sufficient to pass through said pathway in said interior; and
   an adhesive layer on at least one of said surfaces.

2. The magnet receptive medium of claim 1 including a binding agent securing said at least one magnetic particle to said interior.

3. The magnet receptive medium of claim 2 wherein said binding agent has a fluid state and a solid state in which said binding agent secures said at least one magnetic particle to said interior while in said solid state.

4. The magnet receptive medium of claim 1 wherein said adhesive layer comprises a pressure sensitive adhesive layer.

5. The magnet receptive medium of claim 4 wherein said pressure sensitive adhesive layer comprises a layer of adhesive particles.

6. The magnet receptive medium of claim 1 wherein said sheet comprises a woven structure.

7. The magnet receptive medium of claim 1 wherein said sheet comprises a non-woven structure.

8. The magnet receptive medium of claim 1 wherein said magnetic particles are magnetized.

9. The magnet receptive structure of claim 1 wherein said sheet is non-magnetic.

10. A magnet receptive medium, comprising:
    a non-magnetic sheet having a first surface, a second surface, and an interior between said first surface and said second surface;
    at least one pathway extending from at least one of said surfaces to said interior;
    at least one magnetic particle of a predetermined size sufficient to pass through said pathway in said interior;
    a binding agent securing said at least one magnetic particle to said interior wherein said binding agent has a fluid state and a solid state in which said binding agent secures said at least one magnetic particle to said interior while in said solid state; and
    an adhesive layer on at least one of said surfaces.

11. The magnet receptive medium of claim 10 wherein said adhesive layer comprises a pressure sensitive adhesive layer.

12. The magnet receptive medium of claim 11 wherein said pressure sensitive adhesive layer comprises a layer of adhesive particles.

13. The magnet receptive medium of claim 10 wherein said sheet comprises a woven structure.

14. The magnet receptive medium of claim 10 wherein said sheet comprises a non-woven structure.

15. The magnet receptive medium of claim 10 wherein said sheet is flexible.

16. The magnet receptive medium of claim 10 wherein said at least one pathway extends from said first surface to said second surface.

17. The magnet receptive medium of claim 10 wherein said interior comprises at least one cell and said at least one pathway extends to said at least one cell from said at least one of said surfaces.

18. The magnet receptive medium of claim 17 wherein said interior comprises a plurality of cells and said at least one pathway comprises a plurality of pathways wherein said plurality of pathways extends from said first surface to said second surface through said plurality of cells.

19. The magnet receptive medium of claim 5 wherein said layer of adhesive particles comprises micro-adhesive particles.

* * * * *